United States Patent
Assmann et al.

(10) Patent No.: US 7,293,837 B2
(45) Date of Patent: Nov. 13, 2007

(54) FITTING FOR A VEHICLE SEAT

(75) Inventors: Uwe Assmann, Remscheid (DE); Peter Thiel, Remscheid (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/502,047

(22) Filed: Aug. 10, 2006

(65) Prior Publication Data
US 2006/0284471 A1 Dec. 21, 2006

Related U.S. Application Data

(63) Continuation of application No. PCT/EP2005/001928, filed on Feb. 24, 2005.

(30) Foreign Application Priority Data
Mar. 4, 2004 (DE) .................. 10 2004 010 491

(51) Int. Cl.
*B60N 2/22* (2006.01)
(52) U.S. Cl. ..................................... 297/374
(58) Field of Classification Search ............ 297/354.1, 297/374
See application file for complete search history.

(56) References Cited

U.S. PATENT DOCUMENTS

| | | | | |
|---|---|---|---|---|
| 4,200,333 A | * | 4/1980 | Cremer et al. ............. | 297/362 |
| 5,896,973 A | * | 4/1999 | Hochmuth et al. ....... | 192/223.2 |
| 6,267,443 B1 | * | 7/2001 | Kurita et al. ............... | 297/374 |
| 6,715,832 B2 | * | 4/2004 | Dill ............................ | 297/313 |
| 2002/0167210 A1 | | 11/2002 | Dill | |
| 2003/0067205 A1 | | 4/2003 | Eppert et al. | |

FOREIGN PATENT DOCUMENTS

| | | |
|---|---|---|
| DE | 100 12 009 A1 | 9/2001 |
| DE | 101 05 282 A1 | 8/2002 |
| DE | 101 20 854 C1 | 8/2002 |
| DE | 102004018744 B3 * | 9/2005 |

* cited by examiner

*Primary Examiner*—Joe Edell
(74) *Attorney, Agent, or Firm*—Womble Carlyle Sandridge & Rice, PLLC

(57) ABSTRACT

In a fitting (1) for a vehicle seat, in particular for a motor vehicle seat, having a first fitting part (11) and a second fitting part (12) that is mounted on the first fitting part (11) and that can be rotated relative to the latter around a central axis (A), and having also a clasping ring (21) that is connected to the first fitting part (11) and that engages over the second fitting part (12) in order to secure it axially, an intermediate ring (31) is arranged between the clasping ring (21) and the second fitting part (12).

19 Claims, 2 Drawing Sheets

FITTING FOR A VEHICLE SEAT

CROSS-REFERENCE TO RELATED APPLICATION

The present application is a continuation of International Application PCT/EP2005/001928, which was filed Feb. 24, 2005. The entire disclosure of International Application PCT/EP2005/001928 is incorporated herein by reference.

BACKGROUND OF THE INVENTION

The present invention relates to a fitting for a vehicle seat, in particular for a motor vehicle seat, having a clasping ring connected to a first fitting part and engaging over a second fitting part so that the second fitting part is mounted to the first fitting part, the second fitting part can be rotated relative to the first fitting part around a central axis, and the second fitting part is axially secured.

A fitting of the type described immediately above is known from DE 101 05 282 A1. To enable unobstructed relative rotation between the fitting parts, a play is provided between them. When the fitting is used as an inclination adjuster for the backrest of a motor vehicle seat, a backrest compensation spring is provided to partially compensate for the weight of the backrest. The backrest compensation spring ensures that even when the backrest is not under load, the play does not cause any undesired noise (rattling). For other uses of the fitting it would be desirable if the noise could also be suppressed without a backrest compensation spring.

BRIEF SUMMARY OF SOME ASPECTS OF THE INVENTION

The purpose of the present invention is to improve a fitting of the type mentioned above. In accordance with one aspect of the present invention, a fitting for a vehicle seat, in particular for a motor vehicle seat, includes a first fitting part, a second fitting part, a clasping ring, and an intermediate ring. The clasping ring is connected to the first fitting part and engages over the second fitting part. The second fitting part can be rotated around a central axis relative to the first fitting part. The clasping ring restricts any movement of the second fitting part relative to the first fitting part in the axial direction. The intermediate ring is positioned between the clasping ring and the second fitting part.

Because an intermediate ring is placed between the clasping ring and the second fitting part, the play needed for the actuation can be compensated for in such a way that no disturbing rattling noises occur, even without a backrest compensation spring. In order to reduce wear, i.e. to limit wear to a few specific areas, the intermediate ring is preferably driven by being rotationally fixed to the second fitting part or to the clasping ring. Assembly of the fitting is made somewhat simpler and thus less expensive if the intermediate ring is driven by being rotationally fixed to the second fitting part, and the intermediate ring sits on the outside of the second fitting part.

The intermediate ring includes a lateral surface that extends in the circumferential direction of the intermediate ring. The lateral surface preferably ensures, on the one hand, that the intermediate ring is driven by the second fitting part; this is accomplished by providing the lateral surface with at least one recess that accepts a radially projecting lug mounted on the second fitting part in order to permit positive engagement. On the other hand, by being fitted with at least one spring projection that is radially in resilient contact with the clasping ring, the lateral surface also compensates for the radial play and tolerance. Despite this, there is still sufficient play available to prevent any jamming of the fitting. The intermediate ring preferably also possesses an axially oriented end face (e.g., an end face that faces in the axial direction) by means of which the intermediate ring preferably acts as an axial sliding element, i.e. by ensuring a low-level of friction between the second fitting part and the clasping ring. However, the intermediate ring can be of more simplified design such that it performs only some of these tasks; for example, spring projections may not be provided.

In contrast, for example, to DE 101 20 854 C1, the intermediate ring according to the present invention is preferably arranged on the first fitting part in an area where the first fitting part does not bear the second fitting part; therefore, the intermediate ring is located outside the force path. This arrangement ensures not only low load stress and thus also low wear, but it also makes it possible for the intermediate ring to be manufactured preferably from plastic, which keeps both the manufacturing costs and the weight down. For special applications, the intermediate ring can, however, also be made of metal. In a different embodiment, the intermediate ring may be arranged in the vicinity of where the second fitting part bears on the first fitting part, and it is then located outside the force path, at least in the event of a crash.

The fitting according to the invention can be used for a wide variety of purposes, for example to pivot the backrest of a vehicle seat, to adjust the inclination of a thigh support, or for any other folding and locking of part of the vehicle seat. The fitting may be a detent fitting of the kind described, for example, in DE 101 05 282 A1, or it may take the form of a geared fitting as described, for example, in DE 101 20 854 C1 having two internal gears and a central planetary gear.

Other aspects and advantages of the present invention will become apparent from the following.

BRIEF DESCRIPTION OF THE DRAWINGS

The present invention is explained in greater detail below with reference to exemplary embodiments which are illustrated in the drawings, in which.

DETAILED DESCRIPTION OF EXEMPLARY EMBODIMENTS

Figure 1:
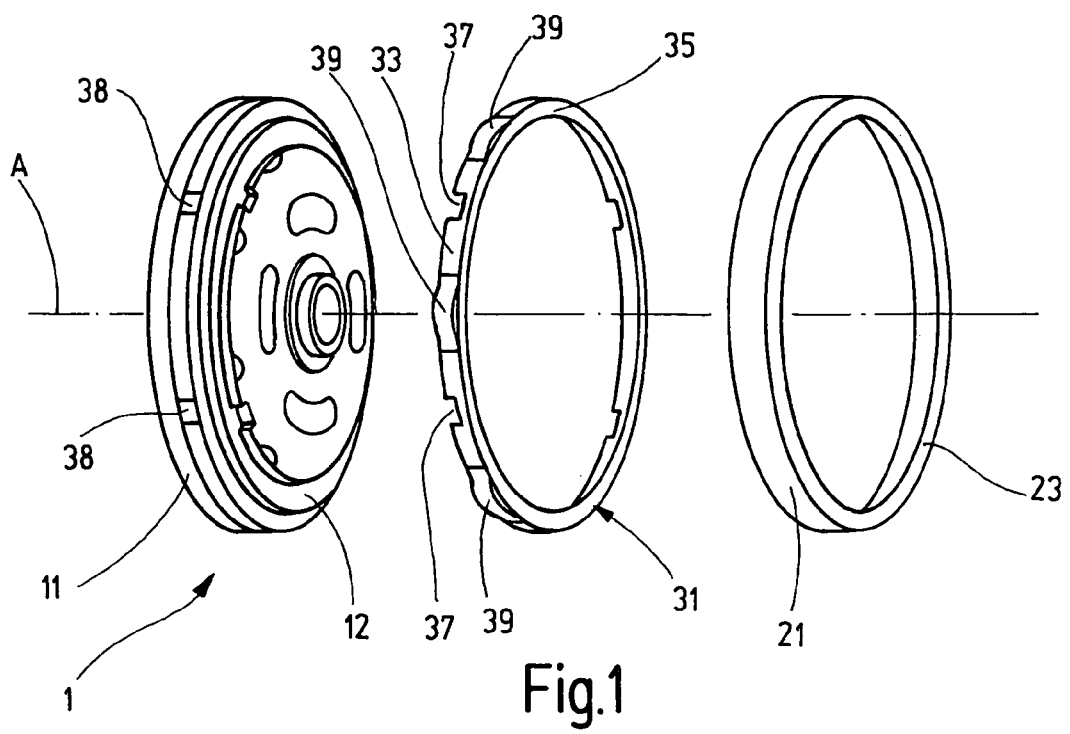
FIG. 1 is an exploded view of the partially assembled first exemplary embodiment.
Figure 2:
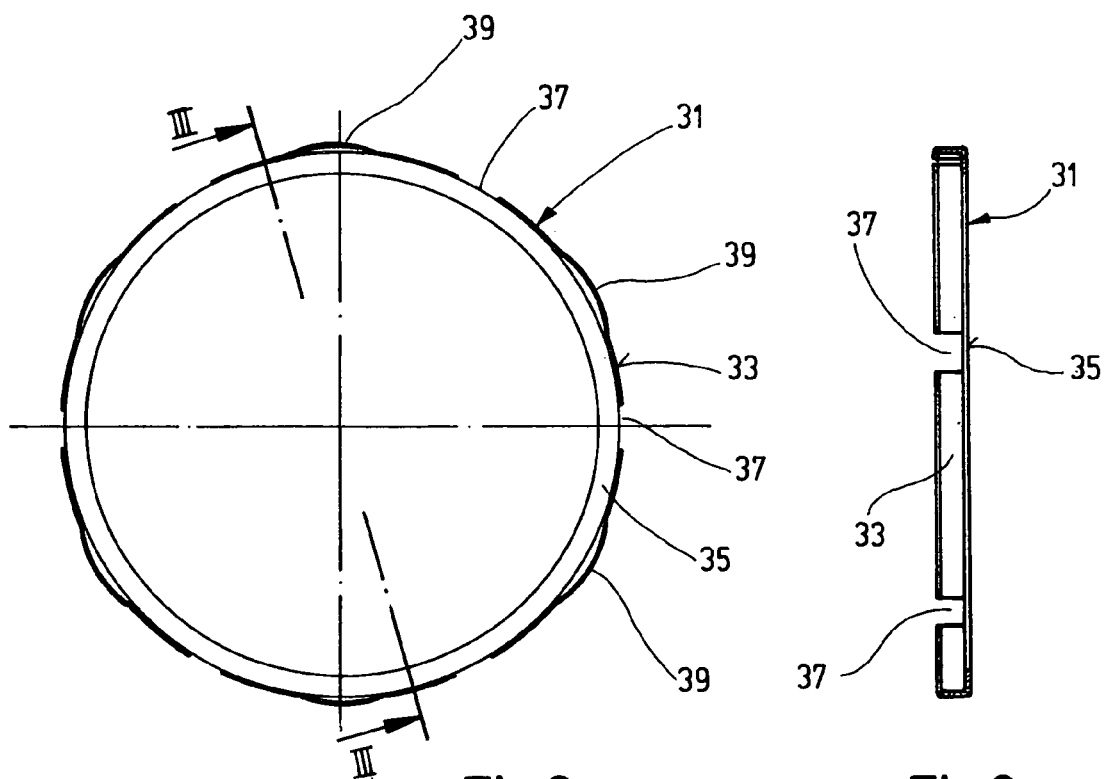
FIG. 2 is a view of the intermediate ring looking in the axial direction.
Figure 3:
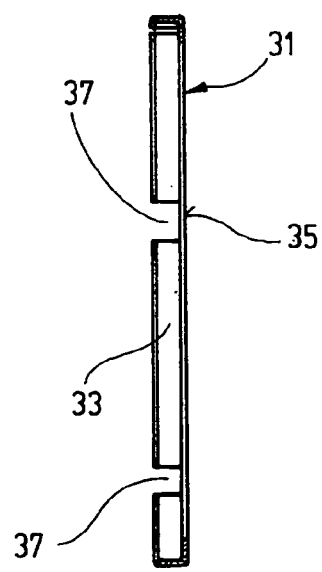
FIG. 3 is a cross sectional view along the line III-III in FIG. 2.
Figure 8:
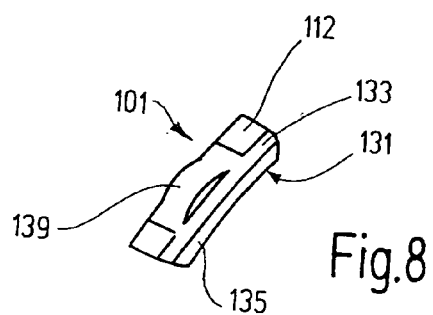
FIG. 8 is a partial view of a second exemplary embodiment.
Figure 4:
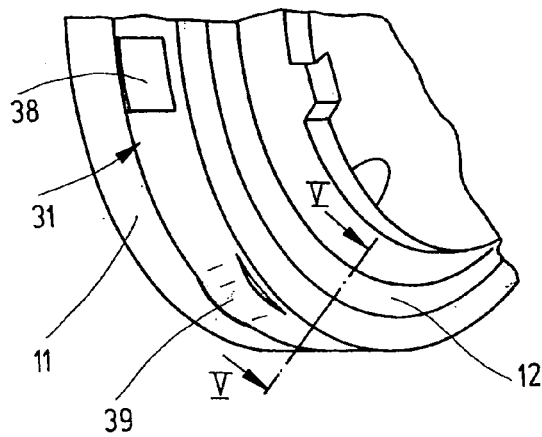
FIG. 4 is a partial view of the exemplary embodiment, without the clasping ring.
Figure 5:
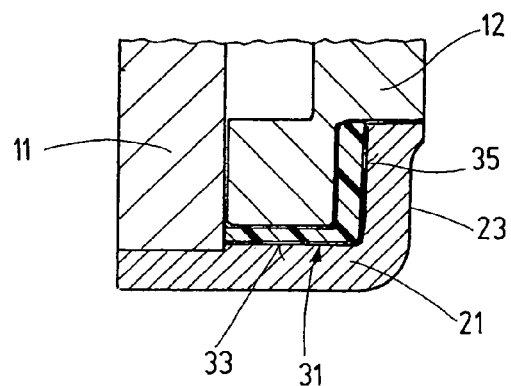
FIG. 5 is a cross sectional view along the line V-V in FIG. 4.
Figure 6:
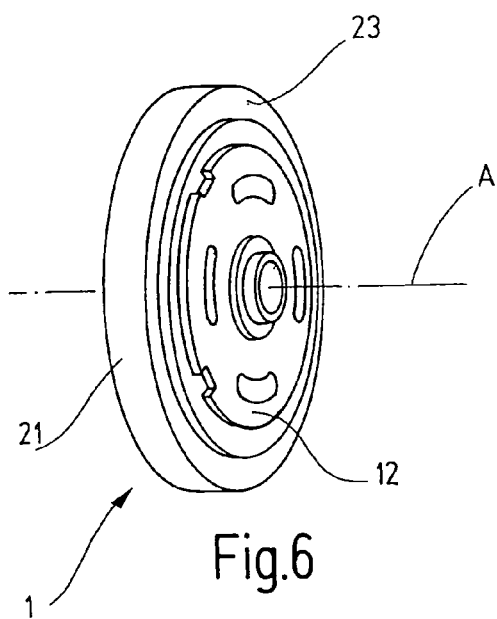
FIG. 6 is a perspective view of the first exemplary embodiment according to FIG. 1.
Figure 7:
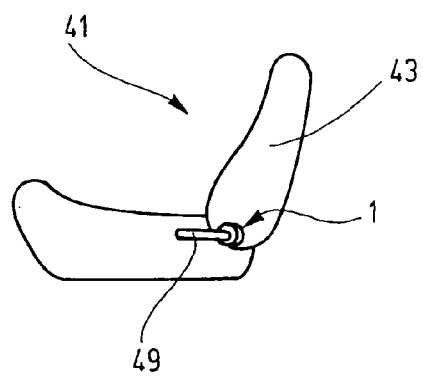
FIG. 7 shows a vehicle seat equipped with the exemplary fitting.

In the first exemplary embodiment, a fitting 1 designed as a detent fitting comprises an approximately disc-shaped first fitting part 11 and a similarly approximately disc-shaped second fitting part 12. The first fitting part 11 and the second fitting part 12 are rotatable relative to each other around a central axis A. The following directional data refer to the cylindrical coordinate system as defined by the central axis A.

As described in DE 101 05 282 A1 (which corresponds to U.S. Pat. No. 6,799,806), the entire content of which is expressly incorporated herein by reference, guiding and bearing segments are formed on the first fitting part 11. On the one hand, these guiding and bearing segments of the first fitting part 11 support on their outer circumferential surface the second fitting part 12, which has the form of a ring gear with a toothed rim; and, on the other hand, the guiding and bearing segments formed on the first fitting part 11 carry between them at least one, and in the present case two, radially movable, toothed locking bars that act cooperatively with the toothed rim of the second fitting part 12 in order to lock the fitting 1.

A clasping ring 21 comprises, on the one hand, a lateral surface running in the circumferential direction. The clasping ring 21 sits with its lateral surface on the radially outward facing circumferential surface of the first fitting part 11 and is rigidly connected to the radially outward facing circumferential surface of the first fitting part 11. The clasping ring 21 may also be formed integrally with the first fitting part 11. On the other hand, the clasping ring 21 possesses a flanged rim 23. The flanged rim 23 is positioned away from the first fitting part 11. The flanged rim 23 forms an annular end surface that engages over the second fitting part 12 and secures the second fitting part 12 in the axial direction. In the radial direction, clearance is provided between the second fitting part 12 and the clasping ring 21 in order to permit unimpeded rotational motion of the second fitting part 12.

An intermediate ring 31 made of plastic is arranged on the second fitting part 12, in the area between the second fitting part 12 and the clasping ring 21. Corresponding to the clasping ring 21, the intermediate ring 31 has a lateral surface 33 and an annular end face 35 that is attached to the lateral surface 33. With its end face 35, which runs transverse to the axial direction, the intermediate ring 31 acts as an axial sliding element between the second fitting part 12 and the clasping ring 21.

The lateral surface 33 is provided with several recesses 37 distributed uniformly over the circumference. The recesses 37 accept radially projecting lugs 38 on the second fitting part 12. This ensures that the intermediate ring 31 is driven in a rotationally fixed manner by the second fitting part 12 (i.e., the second fitting part 12 and the intermediate ring 31 rotate together). A spring projection 39 is formed in each case between two recesses 37. The spring projections 39 project radially from the lateral surface 33 and bear resiliently on the inner surface of the clasping ring 21. As a result, any tolerances, such as out-of-roundness or eccentricity, of the fitting parts 11 and 12 are compensated for without impeding their relative rotation. In addition, the spring projections 39 have a damping effect. Due to the spring deflection and because the intermediate ring 31 is not located at the mounting position between the fitting parts 11 and 12 (e.g., is not located where the fitting parts 11 and 12 bear upon one another), and is thus situated outside the force path, the intermediate ring 31 is not exposed to any stress loading, for example in the event of a crash.

The fitting 1 according to the invention can be used in a motor vehicle seat 41, for example in order to adjust the inclination of its backrest 43, to fold the backrest into the table position or to pivot the backrest in any other way. For this purpose, usually a manually activated lever 49 is located on a transmission rod aligned with the central axis A, between two fittings 1 according to the invention and ensures that the fittings are synchronously unlocked.

The second exemplary embodiment relates to a fitting 101 which, unless otherwise described, is identical to the fitting 1, and for that reason identical and identically functioning components have been designated by reference numbers raised by the number 100. In the second exemplary embodiment, the mounting position of the second fitting part 112 on the first fitting part (e.g., the location where the second fitting part 112 bears upon the first fitting part) is located in the immediate vicinity of the clasping ring. The intermediate ring 131 is axially slightly offset from this mounting position, and the axially opposite side of the end face 135 is axially in contact with the second fitting part 112. The intermediate ring 131 of the second exemplary embodiment has the spring projections 139 located on axially extending parts of its lateral surface 133 that are accepted by recesses in the circumferential surface of the second fitting 112. The circumferential surface of the second fitting 112 acts as the mounting position. Normally, the spring projections 139 project radially above this circumferential surface to compensate for play, but in the event of a crash they are compressed into the recesses, so that the spring projections 139—and thus the entire intermediate ring 131—are located outside the force path.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A fitting for a vehicle seat, the fitting comprising:
   a first fitting part;
   a second fitting part mounted to the first fitting part for being rotated around a central axis relative to the first fitting part, wherein the axis extends in an axial direction;
   a clasping ring,
     (a) with the second fitting part being mounted to the first fitting part by the clasping ring being connected to the first fitting part and engaging over the second fitting part, and
     (b) wherein the clasping ring being connected to the first fitting part and engaging over the second fitting part restricts any movement of the second fitting part relative to the first fitting part in the axial direction; and
   an intermediate ring positioned between the clasping ring and the second fitting part, wherein
   the intermediate ring has a lateral surface that extends in a circumferential direction of the intermediate ring,
   the lateral surface has at least one spring projection,
   the spring projection bears elastically against the clasping ring in a radial direction, and
   the radial direction extends outwardly from the axis.

2. The fitting according to claim 1, wherein the intermediate ring has an end face, and the end face faces in the axial direction.

3. The fitting according to claim 2, wherein the end face of the intermediate ring is operative as an axial sliding element.

4. The fitting according to claim 2, wherein the intermediate ring is made of plastic.

5. The fitting according to claim 1, wherein, at least during a crash, the intermediate ring is positioned outside of at least one area selected from the group consisting of:
   an area where the second fitting part bears on the first fitting part, and
   an area where force passes, at least in the event of a crash, between the first and second fitting parts.

6. The fitting according to claim 1, wherein the intermediate ring is made of plastic.

7. The fitting according to claim 1 in combination with the vehicle seat, wherein the vehicle seat includes a backrest, and the fitting is operatively connected to the backrest for pivoting the backrest.

8. The fitting according to claim 1, wherein:
   the lateral surface has at least one recess,
   the second fitting part includes at least one radially protruding lug, and
   the lug extends into the recess.

9. The fitting according to claim 1, wherein:
   the second fitting part bears on the first fitting part, and
   the intermediate ring is not positioned where the second fitting part bears on the first fitting part.

10. The fitting according to claim 1, wherein:
    there is a path along which force passes, at least in the event of a crash, between the first fitting part and the second fitting part, and
    the intermediate ring is not positioned in the path, at least in the event of a crash.

11. A fitting for a vehicle seat, the fitting comprising:
    a first fitting part having a radially outwardly facing circumferential surface;
    a second fitting part mounted to the first fitting part for being rotated around a central axis relative to the first fitting part, wherein the axis extends in an axial direction;
    a clasping ring including a lateral surface that extends in a circumferential direction of the clasping ring, with the clasping ring further including an annular end surface,
      (a) with the second fitting part being mounted to the first fitting part by
        (1) the lateral surface of the clasping ring sitting on the radially outwardly facing circumferential surface of the first fitting part, and
        (2) the annular end surface of the clasping ring engaging over the second fitting part, and
      (b) wherein the annular end surface of the clasping ring engaging over the second fitting part and the lateral surface of the clasping ring sitting on the radially outwardly facing circumferential surface of the first fitting part restricts any movement of the second fitting part relative to the first fitting part in the axial direction; and
    an intermediate ring positioned between the clasping ring and the second fitting part, wherein the intermediate ring includes
      (a) a lateral surface that extends in a circumferential direction of the intermediate ring, and
      (b) an annular end face that faces in the axial direction and is connected to the lateral surface of the intermediate ring,
    wherein
      (a) the lateral surface of the intermediate ring has at least one spring projection,
      (b) the spring projection bears elastically against the clasping ring in a radial direction, and
      (c) the radial direction extends outwardly from the axis.

12. The fitting according to claim 11, wherein the lateral surface of the clasping ring sits fixedly on the radially outwardly facing circumferential surface of the first fitting part.

13. The fitting according to claim 11, wherein:
    the lateral surface of the clasping ring faces radially inwardly,
    the lateral surface of the intermediate ring faces radially outwardly and is in opposing face-to-face relation with the lateral surface of the clasping ring, and
    the annular end surface of the clasping ring is in opposing face-to-face relation with the annular end face of the intermediate ring.

14. The fitting according to claim 11, wherein the intermediate ring is mounted for rotating with the second fitting part relative to the first fitting part.

15. The fitting according to claim 11, wherein the end face of the intermediate ring is operative as an axial sliding element.

16. The fitting according to claim 11, wherein, at least during a crash, the intermediate ring is positioned outside of at least one area selected from the group consisting of:
    an area where the second fitting part bears on the first fitting part, and
    an area where force passes, at least in the event of a crash, between the first and second fitting parts.

17. The fitting according to claim 11, wherein the intermediate ring is made of plastic.

18. The fitting according to claim 11 in combination with the vehicle seat, wherein the vehicle seat includes a backrest, and the fitting is operatively connected to the backrest for pivoting the backrest.

19. A fitting for a vehicle seat, the fitting comprising:
    a first fitting part;
    a second fitting part mounted to the first fitting part for being rotated around a central axis relative to the first fitting part, wherein the axis extends in an axial direction;
    a clasping ring,
      (a) with the second fitting part being mounted to the first fitting part by the clasping ring being connected to the first fitting part and engaging over the second fitting part, and
      (b) wherein the clasping ring being connected to the first fitting part and engaging over the second fitting part restricts any movement of the second fitting part relative to the first fitting part in the axial direction; and
    an intermediate ring positioned between the clasping ring and the second fitting part, wherein
    the intermediate ring has a lateral surface that extends in a circumferential direction of the intermediate ring,
    the lateral surface has at least one recess,
    the second fitting part includes at least one radially protruding lug, and
    the lug extends into the recess.

* * * * *